United States Patent Office 2,849,321
Patented Aug. 26, 1958

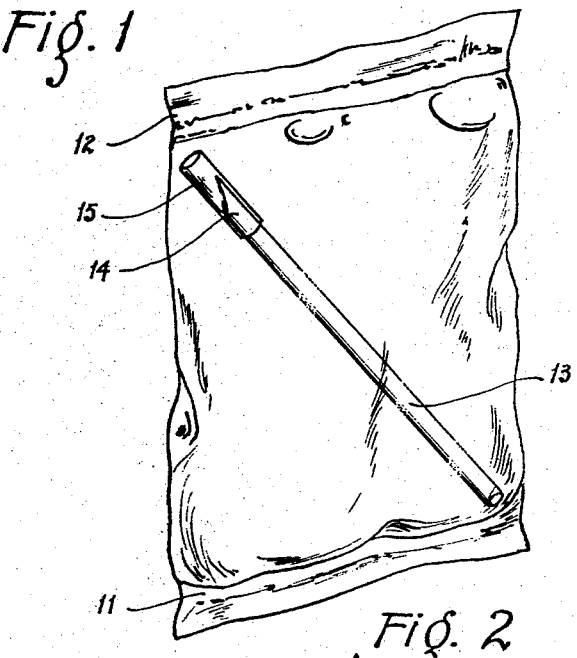
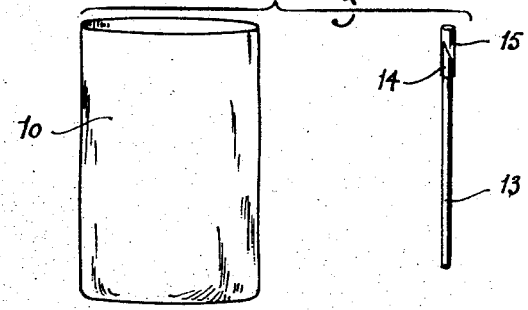
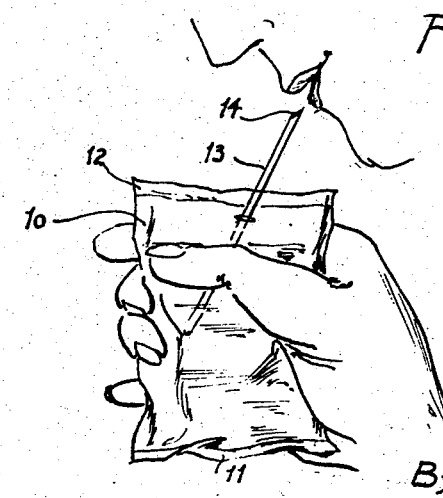

2,849,321

CONTAINER FOR LIQUID AND SEMI-LIQUID FOODSTUFFS

Yves Lhermitte and Raoul Besson, Paris, France, assignors to Societe Glaces Gervais, Paris, France, a corporation of France Application July 16, 1956, Serial No. 597,995

Claims priority, application France July 16, 1955

5 Claims. (Cl. 99—171)

Our invention has for its object a container for liquid, semi-liquid or the like foodstuffs, such a container being particularly intended for the transportation of these products and for their presentation for immediate consumption under excellent conditions of practical use, the package being thrown away after use.

Glass containers are unfit by reason of their weight, bulk and brittleness to serve as valueless empties for the transportation and consumption of such products. As a matter of fact, their cost price is such that it leads to requiring a consignment and such consignments are obviously objectionable.

Glass packings are sometimes replaced by cardboard containers so as to allow selling foodstuffs and beverages in empties which need not be taken back but cardboard containers show a number of drawbacks such as a substantial bulk when empty, the opacity of their walls which does not allow the contents to be seen, the necessity of resorting to paraffin-coated cardboards which material cannot be glued easily, the difficulty in the opening, etc.

In order to remove the above-listed drawbacks of glass or carbdboard containers, it has been proposed to resort to containers constituted by a sheet of welded plastic material inside which the product to be sold may be readily enclosed and carried. Such containers forming small bags are light, yielding and unbreakable. They may be made of transparent material so that the contents are readily apparent to view. They may be stored flat, before they are filled, within a small bulk.

Although such containers of plastic material have multiple advantages, their practical use shows a number of difficulties among which we should mention the manner of handling the container so that it may be filled and remain fluidtight after the said filling. To this end, it has been proposed to provide such containers made of plastic material with a valve which serves for filling purposes and remains closed under the action of the inner pressure developed by the product introduced into the container, said product being subsequently drawn out by the user through the agency of a straw entering the gap between the edges of the suitably designed valve. This structure requires an individual execution of the bags so that it is expensive and furthermore it leads to technical difficulties by reason of the necessity of welding the valve onto the bag wall and in fact of welding at certain points four thicknesses of plastic material over one another. Furthermore, such valves are never perfectly fluidtight in use.

It has also been proposed to cut out this obligation of equipping the bag with individual valves by producing them starting from a very long tube of plastic material which is filled with the product it is to contain and by welding said tube at uniform intervals. It is thus possible to obtain a very long chain of unitary bags which are thenafter severed by cutting them along the transverse welds with a view to selling them separately.

In practice this manner of operating leads to mishaps and liquids remains often enclosed inside the welded sections so that the latter are insufficiently fluidtight. Furthermore, with bags thus constituted, the consumer is constrained to tear or cut open one of the welded edges of the bag, when he wishes to drink its contents and this requires a transfer into another container for consumption in situ.

Our invention has for its object to remove such drawbacks by means of a container showing the required grade of transparency, fluidtightness, impossibilty of being tampered with and convenience in use while its cost price is sufficiently low for it to be sold in accordance with the single-service procedure, the packing being discarded and never returned.

According to the main object of our invention, the container is constituted by a small bag of transparent plastic material completely closed through welding after it has been filled, said container being associated with a straw having a bevelled end which serves for perforating the wall of the bag at the moment of the consumption of its contents through a suction exerted on the straw projecting then through the perforation thus executed.

In particular, the bag may be advantageously constituted by a plastic sheath obtained through extrusion and welded at both ends along two transverse lines of weld.

The straw having a bevelled end, which is associated with the bag, is advantageously urged into the mass of liquid or semi-liquid foodstuff filling the bag at the moment of the filling of the latter. In order to prevent any undesired perforation or opening of the bag during its transportation, the bevelled end of the straw is provided with a movable protecting element which may be shifted away through sliding at the moment of the consumption of the foodstuff by the user.

When it has been suitably filled and closed, our improved container is perfectly tamper-proof. It provides a full guarantee from a hygienic standpoint and it prevents any fraudulent operation. The straw engaging the contents of the container is also free from any contamination or deterioration.

The valves used hitherto for the filling or emptying of the contents are thus no longer necessary. However the drinking of the contents is an easy matter and may be performed at any moment without any instrument or the like auxiliary, since the packings described contain at the very start the straw designed both for opening the bag and for drawing out its contents, these operations being performed through a very simple movement.

We have illustrated by way of example in the accompanying drawings a preferred embodiment of our invention. In said drawings:

Fig. 1 is a view of the container when finished and filled and ready for sale and consumption.

Fig. 2 shows separate the two parts forming the container illustrated in Fig. 1.

Fig. 3 shows the container during consumption.

Our container includes as illustrated a bag constituted by an extruded sheath section of plastic material 10 without any extending sides; said sheath is closed transversely by the two lines of weld 11 and 12. The line of weld 11 is executed before the contents are introduced into the bag while the line of weld 12 is executed after the filling.

It should be remarked that in this embodiment, the lines of weld 11 and 12 closing the bag are executed transversely i. e. perpendicularly to the direction of extrusion of the sheath 10. It is a well known fact that such transverse welds provide perfect fluidtightness and this fluidtightness is still more reliable since the welds are performed only on two thicknesses or plies of plastic material. This cuts out any longitudinal welds the fluidtightness of which is sometimes questionable.

Inside the bag thus constituted, we introduce at the moment of the filling a straw 13 the end 14 of which is cut obliquely so as to form a perforating point. In order that said point may not perforate the wall of the bag in an untimely manner during transportation and handling, the cut or bevelled end 14 of said straw is capped by a protecting member 15. Said member 15 may be constituted by a cap engaging the end of the straw with a slight friction; it may be in particular constituted by a section of a tube, the diameter of which is slightly larger than that of the straw so as to slide with slight friction over the latter. The straw 13 fitted with its protecting cap 15 is introduced inside the bag at the moment of the filling of the latter i. e. before the weld 12 is executed. Said straw is consequently immersed inside the liquid or semi-liquid product contained inside the bag.

It should be pointed out that the practical execution of the container of the type described is an easy matter and may be performed at a high rate on automatic machines, both as concern the execution of the welds and the filling of the container with foodstuff and also with a straw. This manufacture may thus be made under excellent conditions of price which allows furnishing such containers as empties to be discarded. This possibility of discarding the container justifies the perforation of the walls of the bags by the straws without this leading to any drawback and this allows further completely closing the bag through welding after introduction of the straw into it without the provision of any special output for the contents being required. This opening of a sealed bag, which is tamper-proof up to the moment of the consumption of the foodstuff, by means previously incorporated with the bag for said purpose forms one of the characteristic features of our invention.

The container thus equipped and its contents may be subjected to a germicidal action for instance by means of sterilizing radiations such as ultra-violet rays or the like.

For drinking, the consumer holds the bag in one hand and exerts a pressure on said bag so as to hold the straw 13 in position. He then acts with his other hand to make the protecting cap 15 slide so as to release the point 14 of the straw. It is then sufficient to urge said point 14 of the straw against the wall 10 of the bag so as to perforate the latter and to allow the straw to project slightly out of the bag as illustrated in Fig. 3, the other end of the straw remaining inside the bag. The straw 13 which projects thus slightly out of the bag may now serve for drawing out the contents of the bag through suction.

What we claim is:

1. A container for liquid and semi-liquid foodstuffs to be discarded after consumption, said container comprising an entirely sealed bag of yielding plastic material filled with the foodstuff, a drinking straw having a bevelled end housed inside the filled bag and immersed in the foodstuff and a protecting element removably capping the bevelled end of the straw and adapted to be shifted away from said bevelled end.

2. A container for liquid and semi-liquid foodstuffs to be discarded after consumption, said container comprising a bag constituted by an extruded sheath section of yielding plastic material sealed transversely along its open ends over the foodstuff filling the sheath section, a drinking straw having a bevelled end housed inside the filled bag and immersed in the foodstuff and a protecting element removably capping the bevelled end of the straw and adapted to be shifted away from said bevelled end through a pressure exerted manually on the outside of the bag, the straw being adapted to perforate said wall of the bag and to project outside same and provide thus a communication between the inside and the outside of the bag.

3. A container for liquid and semi-liquid foodstuffs to be discarded after consumption, said container comprising an entirely sealed bag of yielding plastic material filled with the foodstuff, a drinking straw having a bevelled end housed inside the filled bag and immersed in the foodstuff and a sleeve-shaped part frictionally engaging the bevelled end of the straw and adapted to be shifted away from said bevelled end.

4. A method for producing a substantially valueless container filled with a liquid or semi-liquid foodstuff adapted to be drawn out by means of a straw having a bevelled end, consisting in cutting a sheath of yielding plastic material into sections of a predetermined length, closing transversely one of the ends of each section, filling said sections with the desired foodstuff, inserting in each section a drinking straw having a bevelled end, closing transversely the second open end of each section and sterilizing the filled and closed container through irradiation.

5. A method for producing a substantially valueless container filled with a liquid or semi-liquid foodstuff adapted to be drawn out by means of a straw having a bevelled end, consisting in cutting a sheath of yielding plastic material into sections of a predetermined length, closing transversely one of the ends of each section, filling said sections with the desired foodstuff, inserting in each section a removably capped drinking straw having a bevelled end, and closing transversely the second open end of each section.

References Cited in the file of this patent

UNITED STATES PATENTS

| 968,425 | Schiff | Aug. 23, 1910 |
| 2,373,340 | Rohdin | Apr. 10, 1945 |

FOREIGN PATENTS

| 6,111 of 1912 | Great Britain | Sept. 5, 1912 |
| 495,372 | Great Britain | Nov. 11, 1938 |